US012653178B1

(12) United States Patent
Wynalda

(10) Patent No.: US 12,653,178 B1
(45) Date of Patent: Jun. 16, 2026

(54) SCENT PADS AND HEATER TO DISTRIBUTE HUNTING SCENT

(71) Applicant: Wyndscent, LLC, Belmont, MI (US)

(72) Inventor: David Wynalda, Comstock Park, MI (US)

(73) Assignee: Wyndscent, LLC, Belmont, MI (US)

( * ) Notice: Subject to any disclaimer, the term of this patent is extended or adjusted under 35 U.S.C. 154(b) by 694 days.

(21) Appl. No.: 18/100,476

(22) Filed: Jan. 23, 2023

Related U.S. Application Data

(60) Provisional application No. 63/301,899, filed on Jan. 21, 2022.

(51) Int. Cl.
    *A01M 31/00* (2006.01)

(52) U.S. Cl.
    CPC ................................. *A01M 31/008* (2013.01)

(58) Field of Classification Search
    CPC .................................................. A01M 31/008
    See application file for complete search history.

(56) References Cited

U.S. PATENT DOCUMENTS

| | | | |
|---|---|---|---|
| D282,954 S | 3/1986 | Ganor | |
| 5,700,430 A | 12/1997 | Bonnema et al. | |
| D423,071 S | 4/2000 | Bonnema | |
| 6,663,838 B1 | 12/2003 | Soller et al. | |
| 8,244,115 B2 | 8/2012 | Wang et al. | |
| D801,749 S | 11/2017 | Wang et al. | |

| | | | |
|---|---|---|---|
| D818,558 S | 5/2018 | Wang et al. | |
| 10,271,538 B2 | 4/2019 | Shapiro et al. | |
| 10,278,382 B2 * | 5/2019 | Wynalda, Jr. ........... | A61L 9/032 |
| 10,357,033 B2 | 7/2019 | Marchetti et al. | |
| D868,932 S | 12/2019 | Zhu | |
| 10,638,743 B1 | 5/2020 | Shapiro et al. | |
| D897,485 S | 9/2020 | He | |
| D946,107 S | 3/2022 | Chojnacki et al. | |
| D989,223 S | 6/2023 | Liu | |
| D992,679 S | 7/2023 | Cui | |
| D995,705 S | 8/2023 | Luo | |
| D997,290 S | 8/2023 | Liu | |
| 2004/0151747 A1 | 8/2004 | Davis et al. | |
| 2014/0336253 A1 | 11/2014 | Breitenbach et al. | |

(Continued)

OTHER PUBLICATIONS

Thermacell, Original Mosquito Repellent Refills, accessed Aug. 9, 2022, from https://www.thermacell.com/products/original-mosquito-repellent-refills.

(Continued)

*Primary Examiner* — Carlos A Azpuru

(74) *Attorney, Agent, or Firm* — Fred Zollinger

(57) ABSTRACT

A hunting scent distribution pad is used with a scent distribution device to distribute an aromatic hunting scent. The scent can be configured to attract game, to cover the hunter's scent, or to create a barrier to discourage game for moving into a particular area. The scent distribution device includes a heater than heats the pad to distribute the scent. The pad is made by freeze drying urine to a powder material and mixing it dry or slightly wet with a carrier material such as propylene glycol or vegetable glycerin that will not burn when subjected to the heat of the scent distribution device. The carrier material preserves the urine materials and freezes at a lower temperature than water.

15 Claims, 3 Drawing Sheets

(56)           References Cited

U.S. PATENT DOCUMENTS

| | | |
|---|---|---|
| 2021/0120806 A1 | 4/2021 | Donoho |
| 2021/0235684 A1 | 8/2021 | Wang |

OTHER PUBLICATIONS

Thermacell, MR300 Portable Mosquito Repeller, accessed Aug. 9, 2022, from https://www.thermacell.com/products/mr300-repeller.

Thermacell, Patio Shield Mosquito Repellent Metal Edition, accessed Aug. 9, 2022, from https://www.thermacell.com/products/patio-shield-mosquito-repellent-metal-edition.

Wildgame Innovations ZeroTrace Plasma Ion Portable Unit | Scent Eliminator for Clothing & Gear,Gray,Pionprt; Retrieved from Amazon. com Nov. 28, 2023, https://www.amazon.com/Wildgame-Innovations-ZeroTrace-Portable-Eliminator/dp/B086DW48MT.

* cited by examiner

SCENT PADS AND HEATER TO DISTRIBUTE HUNTING SCENT

CROSS REFERENCE TO RELATED APPLICATIONS

This application claims the benefit of U.S. Provisional Patent Application No. 63/301,899 filed Jan. 21, 2022; the disclosures of which are incorporated herein by reference.

BACKGROUND OF THE DISCLOSURE

1. Technical Field

The disclosure relates to scent distribution devices used for hunting. In particular, the disclosure relates to hunting scent pads for use with hunting scent distribution devices and methods for making the scent pads.

2. Background

Devices that distribute a scented material through evaporation are known for insect control and as air fresheners. One type of existing device uses a heat source to warm a pad that carries the volatile material that is to be distributed into the air. The heat applied to the pad evaporates the volatile material which carries the scent into the air that comes into contact with the device. The heat can be generated by an electric resistance heater or a gas-burning heater. One exemplary device for repelling insects is sold under the THERMACELL® trademark by Thermacell Repellents, Inc.

Hunters use scents during game hunting for different purposes. One use is to distribute a scent that is used to attract game. Another use is to distribute a scent that covers the hunter's scents. A further use is to distribute a barrier scent to discourage game from going into an area.

SUMMARY OF THE DISCLOSURE

The disclosure provides a pad that can be used with a scent distribution device to distribute an aromatic hunting scent. The scent can be configured to attract game, to cover the hunter's scent, or to create a barrier to discourage game for moving into a particular area.

The disclosure provides a scent pad that distributes the scent of natural game urine into the air to attract game during a hunt.

The disclosure provides a scent pad that is made from an absorbent paper-based material. The pad has been impregnated with a liquid scent material that includes natural game urine such as doe urine. The urine materials are carried by a carrier material such as propylene glycol or vegetable glycerin that will not burn when subjected to the heat of the scent distribution device. The carrier material preserves the urine materials and freezes at a lower temperature than water.

The disclosure provides a method of making the scent pad wherein a natural urine is dried through a freeze drying process to remove most of the water from the urine to create a powdered urine material. The urine can be frozen before being freeze dried. The powdered urine material is mixed with a propylene glycol or vegetable glycerin (or a combination of both). The combination is applied to the pad and allowed to become absorbed by the pad. The pads are then placed in the scent distribution device and, when heated, the combination evaporates to distribute the urine scent into the air. The same method is used with other scents such as barrier scent materials such as soaps or predator urines.

The preceding non-limiting aspects, as well as others, are more particularly described below. A more complete understanding of the processes and the structures of the devices can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 1:
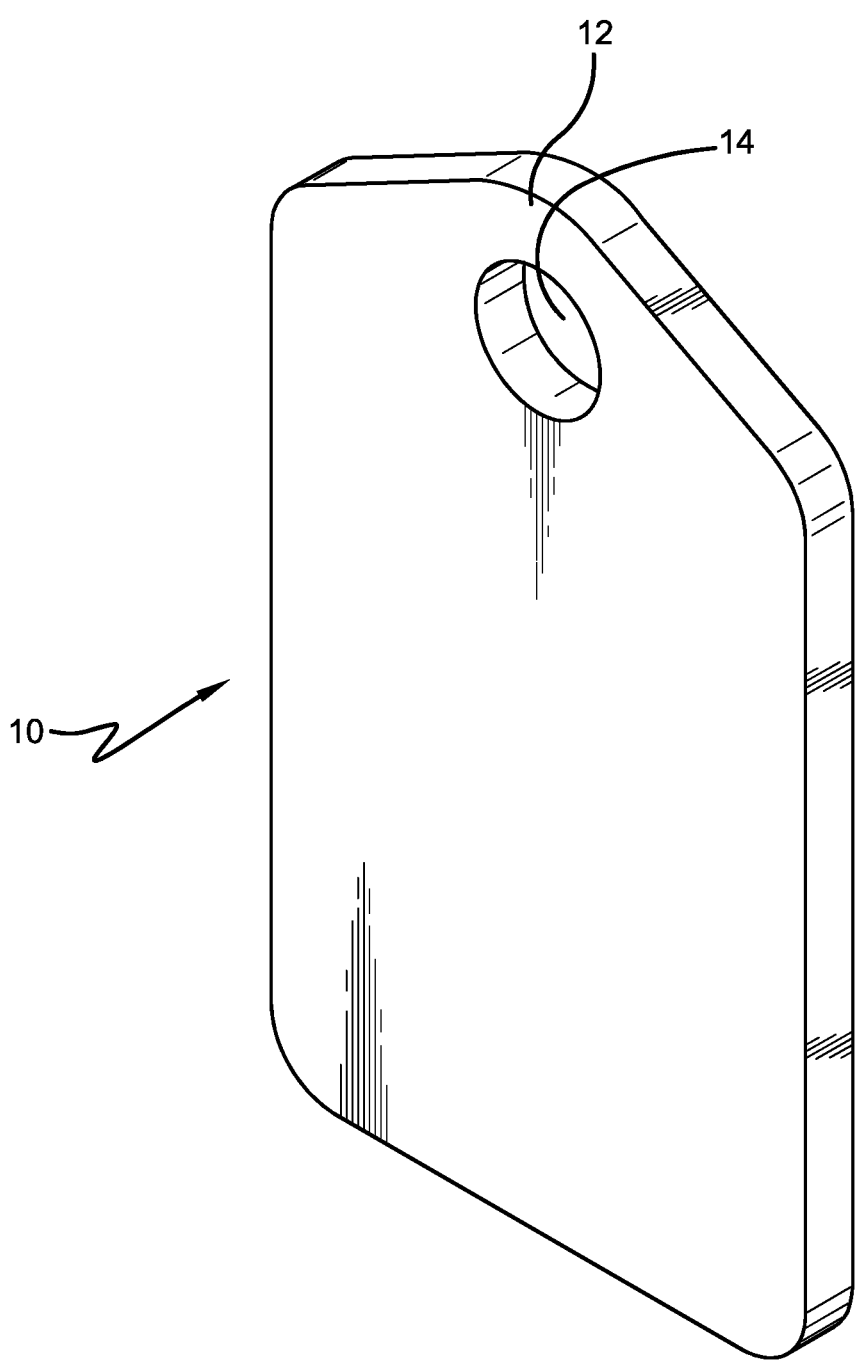
FIG. 1 is a perspective view of an exemplary scent pad.

An exemplary scent pad is indicated generally by the reference numeral 10 in FIG. 1. Scent pad 10 is made from an absorbent material such as a paper-based material. A paperboard can be used. The thickness can be $\frac{1}{16}$ of an inch to a quarter of an inch. The body of each pad 10 is sized to work with a selected scent distribution device 20 that includes a source of heat that is applied in a way that does not burn the material of pad 10. As an option, each pad 10 can include a tab 12 that defines an opening 14. Tab 12 is used to insert and remove pad 10 from device 20. Opening 14 allows a pad 10 to be carried on a carrier ring or lanyard. This also allows pad 10 to be hung at a hunt site or on a hunter to passively distribute scent instead of being used with device 20.

Each pad 10 is made by impregnating the body of pad 10 with a scent material. The scent material is released from pad 10 through passive evaporation or accelerated evaporation through the use of a heated scent distribution device 20. In one example, urine from a game animal is freeze dried to remove almost all of the water from the urine. The urine can be frozen before it is freeze dried. This creates a powdered urine material. The powdered material is mixed with a vaping base such as a propylene glycol, a vegetable glycerin, or a combination of vaping bases. The combination of the powdered material and the vaping base is applied directly to the surface of pad 10 and allowed to soak into the material of pad 10. Once it is absorbed, it is packaged and pad 10 is ready to use. A less viscous vaping base liquid is more desirable for soaking the material into pad 10 in less time. Using propylene glycol or a majority of propylene glycol provides for faster absorption into pad 10 than using vegetable glycerin.

As an option, the dried urine can be mixed with water before being mixed with the vaping base. When water is used, the water is added at about (within 10%) a one to four volume ratio. For example, 1 ml of water can be added to 4 ml of dried urine.

As another option, a synthetic urine scent material may be added to the pads 10. Instead of the dried urine material, the synthetic version uses ammonia, urea, or a combination (liquid or dried) of both mixed with the vaping base.

The vaping base freezes at a lower temperature than water which allows the scent to be released faster than a water-based material in weather than is below zero Celsius. Propylene glycol has a freezing temperature of about −12 C and vegetable glycerin has a freezing temperature of about −17 C. The vaping base also limits the growth of bacteria on the urine material to preserve it longer than a water-based urine material.

The use of the vaping base as the carrier material for the urine material also allows the scent to be evaporated at a slower rate that with a water-based carrier.

In one exemplary method, the combination of the powdered urine and vaping base is applied on top of the pad and allowed to soak into the pad material. The vaping base has a viscosity that prevents it from flowing off of the pad but is viscous enough to be absorbed. Once the material is applied, it is naturally absorbed over time.

The vaping base acts as a preservative for the urine, keeps it from unintentionally evaporating until heat is applied, keeps it from freezing, and evaporates to distribute the scent when heat is applied.

In an exemplary configuration, the volume of powdered urine and vaping base is about (within 10%) three-quarters the volume of the portion of pad 10 under tab 12. This ratio fills pad 10 evenly and does not provide a 'wet' feel to pad 10.

Figure 2:
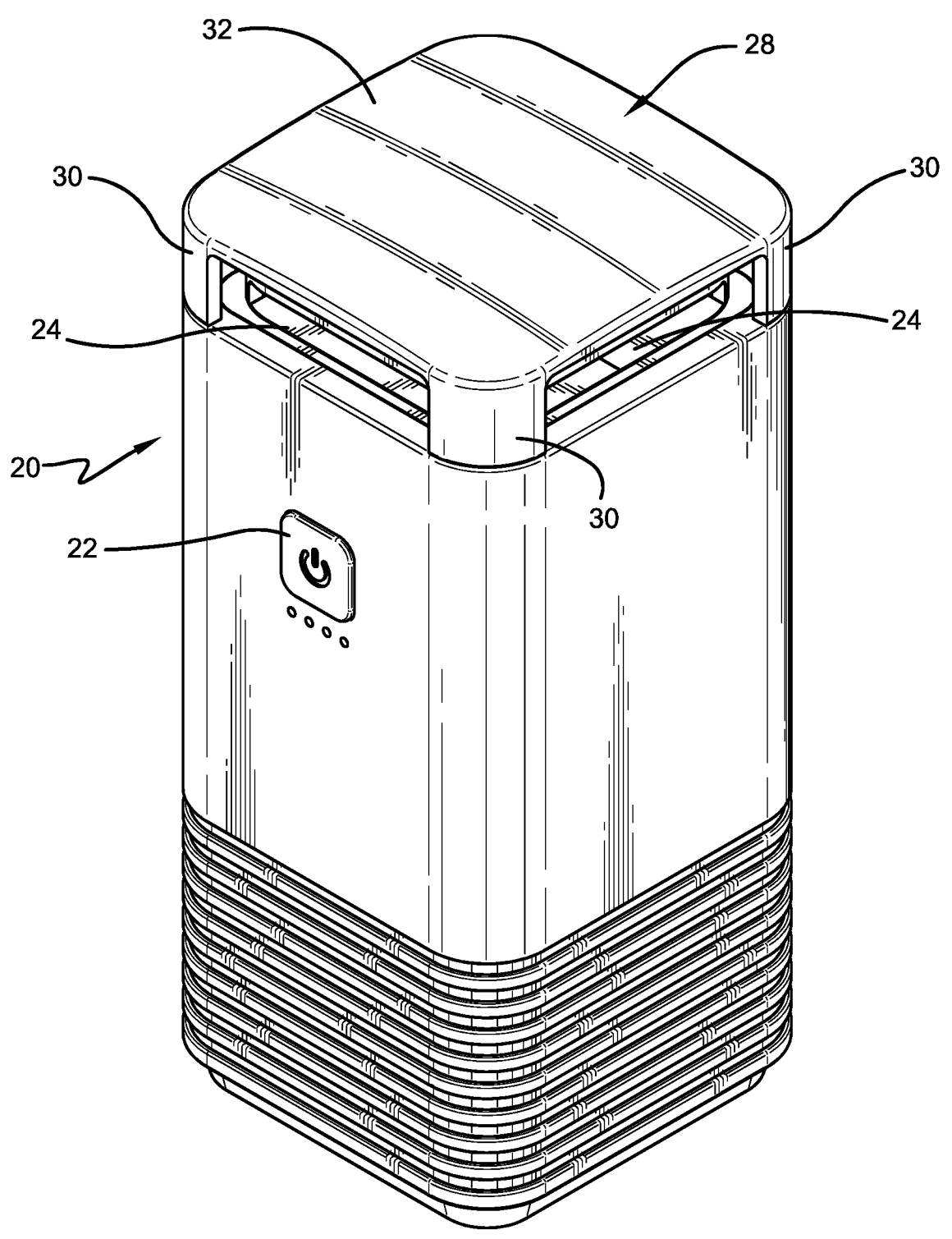
FIG. 2 is a front perspective view of a scent distribution device.
Figure 3:
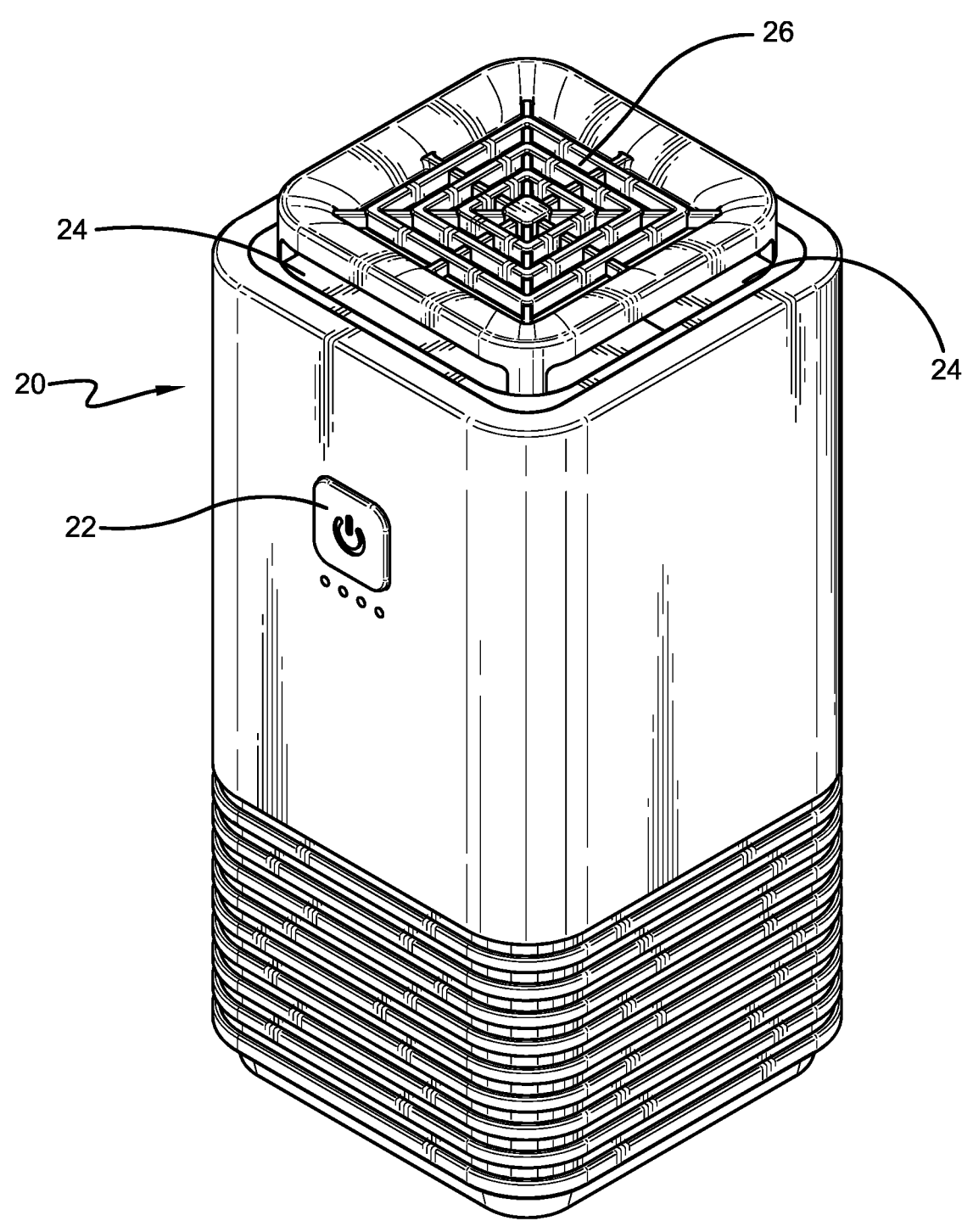
FIG. 3 is a front perspective view of the scent distribution device with the cover removed.

Pads 10 can be used passively by hanging them around a hunting location or by hanging them from a tree stand or from a hunter's equipment. In order to increase the scent being distributed by pads 10, scent distribution device 20 is used to apply heat to a pad 10 to distribute scent from pad 10. An example device 20 is depicted in FIGS. 2-3. Device 20 generally includes a rechargeable battery, a controller, and a heater. The heater is an electric heater. In other configurations, a gas-powered heater can be used. The controller provides options for the operation of device 20. Input can be provided to the controller through a push button 22 or through a remote control. The remote control can be radio frequency or infrared. Operation options include an "on" option where the battery continuously powers the heater. Other options have the battery power the heater for a first time period and then turn off for a second time period and then repeat. The first and second time periods can be selected. For example, the heater can be turned on for ten minutes and then turned off for ten minutes. Lights under button 22 indicate the operation mode.

Device 20 is provided with a simple on-off mode wherein device 20 heats pad 10 when the users turns device 20 on and stops when the user turns device 20 off. The controller provides operating modes that are useful for some hunting situations. In the configuration depicted in FIGS. 2 and 3, four indicator lights indicate the operating mode of device 20. Multiple operating modes are programmed with each providing for different scent distribution patterns. For example, the first condition can be a long continuous distribution of scent (such as ninety minutes) followed by ninety minutes of short bursts (such as ten minutes) spaced apart every ten minutes. The second configuration can be set to distribute short bursts (such as five to ten minutes) at longer time intervals (every ten to fifteen minutes) for an extended time (such as two to three hours). Another configuration can be programmed by the user. The controller can include a programmable circuit board that includes a timer. The settings of controller can be changed through a push button accessible to the user or through software on a phone communicating wirelessly. In another configuration, a visible screen is used to display the settings to the user.

The heater is located under a guard over which pad 10 is slid when inserted into device 20. The guard is a metal structure that heats evenly and functions as a hot plate to apply the heat from the heater evenly to pad 10. In the exemplary configuration of device 20, pad 10 can be inserted into one of four openings 24 from any side of device 20. When inserted, pad 10 is under a grid 26 and over a guard which is heated from the heater. The heat evaporates the scent material and distributes the scent. A cover 28 is removably connected over grid 26 to stop pad 10 from becoming wet when device 20 is used in the rain or snow. Cover 28 includes four legs 30 that connect to the corners of the base of device 20. Legs 30 are spaced to provide access to openings 24. Legs 30 are tall enough to keep the canopy 32 of cover 28 above grid 26.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the descriptions and illustrations of the exemplary configurations are examples and the claimed invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A method of making a hunting scent distribution pad comprising the steps of:
   freeze drying urine to create a powdered urine material;
   mixing the powdered urine material with at least one of a propylene glycol and vegetable glycerin to provide a scent material; and
   placing the scent material on an absorbent pad until the scent material is absorbed by the pad.

2. The method of claim 1, further comprising the step of adding water to the powdered urine material before the step of mixing.

3. The method of claim 2, further comprising the step of mixing, by volume, one part water to four parts powdered urine.

4. The method of claim 1, wherein the absorbent pad has a first volume and further comprising the step of absorbing a second volume of scent material into the pad; the second volume being about seventy-five percent of the first volume.

5. The method of claim 4, further comprising the step of absorbing the scent material into a paper-based pad.

6. The method of claim 4, further comprising the step of absorbing the scent material into a pad made from a paperboard.

7. The method of claim 4, further comprising the step of absorbing the scent material into a paper-based pad having a thickness from one-sixteenth of an inch to a quarter of an inch.

8. A method of making a hunting scent distribution pad comprising the steps of:
   mixing a urine material with at least one of a propylene glycol and vegetable glycerin to provide a scent material wherein the urine material includes at least one of a natural urine and a synthetic urine; and
   placing the scent material in contact with an absorbent pad until the scent material is absorbed by the pad.

9. The method of claim 8, further comprising the step of freeze drying the urine material to create a powdered scent material before the urine material is mixed to provide the scent material.

10. The method of claim 9, further comprising the step of adding water to the powdered scent material before the step of mixing.

11. The method of claim 10, further comprising the step of mixing, by volume, one part water to four parts powdered scent material.

12. The method of claim 8, wherein the absorbent pad has a first volume and further comprising the step of absorbing a second volume of scent material into the pad; the second volume being about seventy-five percent of the first volume.

13. The method of claim 11, further comprising the step of absorbing the scent material into a paper-based pad.

14. The method of claim 13, further comprising the step of absorbing the scent material into a pad made from a paperboard.

15. The method of claim 13, further comprising the step of absorbing the scent material into a paper-based pad having a thickness from one-sixteenth of an inch to a quarter of an inch.

\* \* \* \* \*